United States Patent Office 2,694,016
Patented Nov. 9, 1954

2,694,016

METHOD OF PRODUCING COATED CERAMIC CAPACITOR

Robert L. Craven, Westfield, and Walter V. Patton, Matawan, N. J., assignors to E. I. du Pont de Nemours & Company, Wilmington, Del., a corporation of Delaware No Drawing. Application June 1, 1950, Serial No. 165,578

6 Claims. (Cl. 117—46)

This invention relates to the production of electrical capacitors and particularly ceramic type electric capacitors having "fired-on" silver electrodes.

Ceramic type capacitors having "fired-on" silver electrodes have become of major importance in connection with electronic equipment, particularly domestic television sets. The current method of producing them involves the application, e. g. by the silk screen technique, i. e. the squeegee method, of a dispersion of finely divided silver in a vehicle comprising a bonding agent, and a volatile solvent therefor to one side of chips of mica, steatite, barium titanate or other ceramic type dielectric material. This print or coating of silver is then dried to remove solvent, sometimes fired, after which the chips are sorted to remove imperfect prints. There is then applied by the same method a similar coating of silver on the reverse side of the chips, after which the chips are again dried and fired whereby the silver coatings are fused onto the dielectric chip to form a metal electrode plate on each side to which electrical leads may be connected by known methods, e. g. by soldering, metallic clips, etc. Such a procedure is time consuming and costly since two separate drying operations and sometimes two firing operations are required.

It is an object of this invention to provide an improved method of producing electrical capacitors of the ceramic type having fired-on silver electrodes. A further object is to provide a method whereby a silver dispersion may be applied to one side of the dielectric chip so that a firm, solid, adherent silver coating is instantly produced which permits the application of a silver coating to the reverse side of the chip without intermediate drying or firing of the first coating and without damage thereto. A still further object is to provide a method for producing capacitors of the above type which method may be practiced without the use of special driers for the removal of volatile constituents from the silver coatings and in which but a single firing operation is involved. Other objects will be apparent from the following description of the invention.

The objects of the invention are accomplished by applying to one side of ceramic type dielectric chips a silver composition of the type hereinafter defined, which immediately upon contact with the chip forms a firm, solid, adherent coating of the composition on the chip; and, without intermediate drying or firing, applying to the reverse side of the chips a coating of a dispersion of finely divided silver in a vehicle which includes a volatile solvent; and thereafter, firing the chips.

The silver composition employed in coating the first side of the chips is a dispersion of finely divided silver in a vehicle comprising: (a) 30 to 80% of material which melts within the range 210 to 230° F., which material may be a wax, a mixture of waxes, or a mixture of a wax or waxes with a wax-like substance; (b) 1 to 10% of ethyl cellulose; (c) 14 to 68% of rosin or a rosin derivative or a mixture of such substances; (d) 0.5 to 10% of an organic dispersion agent suitable for dispersing the silver in the molten vehicle, such as lecithin or phosphorated tall oil; and (e) 0 to 1% of pyrogallic acid. Finely divided silver alone or together with a finely ground glass flux is added to the above vehicle in the proportion of about 1 to 6 parts of silver, or silver plus finely divided glass flux, to 1 part of vehicle. The resulting silver dispersion is a solid at ordinary or normal temperatures, is substantially non-volatile and is applied at a temperature within the range of 120 to 230° F. to the surface of the ceramic object employing the well-known squeegee technique. At these higher temperatures the compositions are pastes or paints which can be readily applied through a heated screen stencil and when so applied to a ceramic object which is at ordinary temperature they solidify almost instantly upon contact therewith to provide a firm, solid, adherent coating thereon, which requires no drying or firing in order to solidify the coating sufficiently to prevent damage thereto during subsequent operations incident to the silvering of the reverse side of the chip. The temperature of the chip to which the hot composition is applied need not be room temperature but should be at least about 15° F. lower than the melting temperature of the composition being applied. In practice, however, the chip ordinarily will be at about room temperature.

Silver coating compositions of the above type are described and claimed in the copending application of Patton, Serial No. 165,579, filed of even date herewith.

The coating of the second or reverse side of thin chips, as defined below, cannot be successfully accomplished with the "hot-melt" type silver composition described above since its application to the reverse side damages the first application due to softening resulting from heat conducted through the chip. Accordingly, coating of the reverse side of thin chips is accomplished using a dispersion of finely divided silver in a vehicle which is non-solid, i. e. pasty or liquid, at ordinary temperatures. Such a vehicle may be of the type usually employed in the application of silver to ceramic objects. They are hereinafter referred to as "air-dry" vehicles, and when they contain dispersed silver the resulting compositions are referred to as "air-dry silver compositions", as distinguished from the "hot-melt" type vehicle or silver compositions described above, since they are solidified by the removal of solvent, i. e. by "drying" in the air, in a drier or in the furnace.

Any of the vehicles employed heretofore which are pasty or liquid at ordinary temperature due to the presence therein of a volatile solvent, or solvents, may be employed as "air-dry" vehicles in the silver compositions for application to the second side of the chip. Such vehicles usually contain a volatile solvent or solvents and an agent or agents to impart suitable bonding, viscosity and dispersing properties to the vehicle. Vehicles of the type described in Deyrup Patent 2,379,507 for use in the application of ceramic colors are suitable air-dry vehicles for the present purpose and constitute a preferred class. These vehicles contain ethyl cellulose as an essential constituent for imparting the desired viscosity and other properties. Any of the commercially available grades of ethyl cellulose may be used but the medium viscosity grade is generally preferred. Other agents may also be present, such as hydrogenated rosin, a bonding agent; and lecithin and various modified alkyd resins, which are dispersion control agents, as indicated in the above patent. As volatile solvents, terpene type solvents such as terpineol, pine oil, turpentine and the like, petroleum solvents, butyl lactate and butyl Carbitol acetate, or mixtures of such solvents are suitable. The amount of ethyl cellulose to be used in such vehicles will depend somewhat on the amounts of other agents such as hydrogenated rosin, lecithin and the like which are present. Thus, when 10 to 30% hydrogenated rosin is used, the ethyl cellulose content usually will be within the range 0.25 to 5%. However, larger amounts of ethyl cellulose, e. g. up to about 30% may be used and are preferred when the vehicle includes only ethyl cellulose and solvent. The most preferred air-dry vehicles will contain 5 to 25% of ethyl cellulose and 75 to 95% of a solvent such as butyl lactate or butyl Carbitol acetate, or mixtures thereof. The final choice of solvent will depend upon the desired drying rate.

Not all vehicles which melt within the range 120 to 230° F. are suitable for preparing hot-melt silver compositions for application to the first side of the chip. In order for a vehicle to be suitable for this purpose it must give a squeegee silver paste or paint which is workable at about 120 to 230° F., i. e., it must not thicken or gel during long periods at the temperature of application; its viscosity should not change substantially at such temperature; it should not clog the screen;

and it should have proper flow and leveling characteristics. This means that the vehicle should be substantially non-volatile at the working temperature, yet it should volatilize fast enough during firing to prevent running or slipping of the print. Furthermore, the vehicle must be one which solidifies instantly on application to the cold chip to form a firm, smooth, tough, adherent coating which is resistant to normal abrasion and shock and is low in carbonaceous residue upon being fired. Also, the vehicle used should give silver prints that are neither too hard nor too soft: if too hard they fracture readily on handling; if too soft, they become marred and distorted readily. It has been discovered that to meet these requirements a vehicle must contain ingredients or types of ingredients which, furthermore, must be present in certain proportion ranges, as specified above.

The essential unit of a capacitor includes two electrically conductive layers separated by a layer of dielectric material. Fired-on silver has been found to be highly practical as the conductive layers while the separating dielectric layer may consist of any of the usual ceramic type dielectric materials such as glass, mica, steatite, bivalent metal titanates, e. g. barium titanate, and the like. Such dielectric layer, herein referred to as a "chip", frequently is in the form of a thin body, e. g. a disc or wafer of a thickness of around 0.05 in. or less, e. g. 0.01 to 0.05 in., but it may also be much thicker. Thus, in the manufacture of high voltage capacitors the dielectric chip may be as thick as 1 in. or more, depending on the voltage to which the capacitor will be subjected during use.

The present method of preparing capacitors involving the application of a hot-melt silver composition to the first side of a chip and an air-dry composition to the reverse side, followed by firing the coated chip, may be successfully practiced using either thick or thin capacitor chips. It is, however, particularly well suited for the production of capacitors using thin chips which constitutes a preferred embodiment of the invention.

The term "thick chip" is used herein to mean a chip which is sufficiently thick to permit application of a hot-melt silver composition to both the first and reverse sides of the chip by the squeegee method as indicated above without damage to the coating on the first side resulting when the hot-melt composition is applied to the reverse side due to thermal softening of the first coating from heat conducted through the chip. The term "thin chip" is used to mean a chip whose thickness is not sufficient to permit the successful application of hot-melt compositions to both sides due to thermal softening of the coating on the first side resulting from conducted heat when the reverse side is coated. In other words, a "thin chip" is one which has such a low heat capacity, because of its thinness, that when a hot-melt composition is applied to its second side, sufficient heat will be conducted through the chip to soften objectionably the coating on the first side; whereas a "thick chip" is one which has such a high heat capacity, due to its thickness, that insufficient heat will be conducted through the chip, when a hot-melt composition is applied to the second side, to damage the solidified hot-melt coating on the first side. A precise numerical definition of the thickness of chips, below which the application of an air-dry composition to the second side becomes essential, is not possible since the critical thickness varies somewhat depending upon the operating conditions and the thermal characteristics of the specific dielectric material used.

The invention is further illustrated by the following examples.

EXAMPLE 1

Barium titanate dielectric chips in the form of wafers about .03 in. thick with a fired-on silver electrode on each side were prepared employing the following technique: a hot-melt silver composition was applied to one side of the chips by the squeegee method using silk or metal screens kept sufficiently hot to maintain the composition in a pasty or fluid condition. The chips were at room temperature and on squeegeeing, the print solidified instantly on the chips so that they could be handled readily and immediately without damage to the unfired print. The chips were then turned over and the print for the second electrode was applied by the squeegee method using an air-dry silver composition. The chips were then placed directly into a lehr and fired to give capacitors having excellent fired-on silver electrodes.

Both the hot-melt and the air-dry compositions of Example 1 contained 65.66% of finely divided silver of about 325+ mesh, 11.20% of a finely divided bismuth lead borosilicate glass flux (80% $Bi_2O_3$, 15.8% PbO, 2.2% $B_2O_3$ and 2.0% $SiO_2$), and 23.14% of vehicle. The hot-melt vehicle consisted of 47.61% hydrogenated rosin, 47.61% paraffin, 2.86% ethyl cellulose having an ethoxy content of 49 to 50% and a viscosity of 200 cps., 1.90% phosphorated tall oil and 0.02% of pyrogallic acid. The air-dry vehicle consisted of 89.54% butyl lactate and 10.46% ethyl cellulose having an ethoxy content of 47 to 48% and a viscosity of 50 cps.

The above hot-melt composition cannot be successfully applied to both sides of these chips because its application to the second side causes objectionable softening of the coating on the first side.

EXAMPLE 2

Excellent fired-on silver coatings on thin mica capacitor chips were obtained following the technique described in Example 1. Both the hot-melt and the air-dry silver compositions used contained 50.3% of finely divided silver of about 325+ mesh, 6.0% of a finely divided lead borosilicate glass flux (79% PbO, 11% $B_2O_3$ and 10% $SiO_2$) and 43.7% of vehicle. The hot-melt vehicle used was the same as for Example 1. The air-dry vehicle consisted of 83.98% butyl lactate and 16.02% ethyl cellulose having an ethoxy content of 49 to 50% and a viscosity of 200 cps. Application of the hot-melt composition to both sides was not practical because of the thinness of the chips.

Other suitable vehicles for use in the formulation of the hot-melt silver composition are shown in the following table, the values given being percentages by weight:

Table 1.—Hot-melt vehicles

| Composition | A | B | C | D | E |
|---|---|---|---|---|---|
| Paraffin | 30.26 | 30.03 | 47.99 | 47.61 | 15.13 |
| Carnauba wax | 7.58 | 7.58 | | | 15.13 |
| Canawax | 22.75 | 22.75 | | | |
| Microcrystalline wax | | | | | 15.13 |
| Spermaceti wax | | | | | 15.13 |
| Stearic acid | | | | | 15.13 |
| Hydrogenated rosin | 30.26 | 30.26 | 47.99 | 47.61 | 15.13 |
| Ethyl cellulose | 3.03 | 3.03 | 2.00 | 2.00 | 3.11 |
| Phosphorated Tall oil | 6.08 | 6.08 | 2.00 | 2.00 | |
| Lecithin | | | | | 6.11 |
| Pyrogallic acid | 0.04 | 0.04 | 0.02 | 0 02 | |

The wax, mixture of waxes, or mixture of wax with a wax-like material used should melt at a temperature within the range of 120 to 230° F. and constitute from 30 to 80%, preferably 40 to 60%, of the vehicle. Examples of suitable waxes and wax-like materials which may be used, either alone, in the case of certain waxes, or as mixtures to provide material of proper melting point, are: paraffin, carnauba wax, spermaceti, beeswax, canawax, microcrystalline wax, palmitic acid, stearic acid and solid soaps.

The ethyl cellulose content of the hot-melt vehicle should be not less than 1% nor greater than 10% and is preferably 1 to 5%. Low, medium or high viscosity material may be used but the medium viscosity grade is generally preferred. This material functions as a viscosifier and as a hardening agent.

The rosin or rosin derivative content of the hot-melt vehicle should be 14 to 68% and is preferably 35 to 55%. This constituent acts as a hardener and facilitates adherence of the silver composition to the dielectric chip. It also aids in rendering the ethyl cellulose miscible with the wax constituent. Examples of suitable materials of this type are: rosin and abietic acid; rosin esters and esters of abietic acid, such as methyl abietate; polymerized rosin and polymerized abietic acid; hydrogenated rosin and hydrogenated abietic acid; and the metal salts of rosin or abietic acid, e. g. the zinc, titanium and calcium salts. The most preferred of these materials is hydrogenated rosin.

The hot-melt vehicle must contain from 0.5 to 10% of an organic phosphate material such as soya lecithin, heat-treated or cooked lecithin and phosphorated tall oil, the latter being preferred. With lecithin, the preferred concentrations are 4 to 10% whereas with phosphorated tall oil the preferred concentration is 0.5 to 7%. These materials function as wetting and dispersion control agents and thus aid in controlling the thickness of the silver composition on the ceramic chip.

Pyrogallic acid is not an essential constitutent of the hot-melt vehicle. However, its presence, e. g. in concentrations of 0.01 to 1%, appears desirable in some instances to inhibit undesired thickening of the hot vehicle or silver composition. Other substances may also be present in minor amounts if desired.

In the preparation of the hot-melt vehicles, the ingredients such as the wax, rosin derivative and ethyl cellulose, are heated together and thoroughly mixed at a suitable temperature, e. g. about 266° F. When the mixture is homogeneous, the remaining ingredients such as the phosphorated tall oil and pyrogallic acid are added and the entire batch is agitated at about the same temperture until completely uniform. Squeegee silver compositions are prepared by mixing silver powder and finely-milled glass flux with the hot vehicle in the desired proportions. After thorough mixing, the resultant paste is passed through a roll mill or other type of equipment commonly used for dispersing pigments in vehicles. To prevent solidification of the paste during milling it is necessary that the mill or rolls be heated, e. g. with steam or hot water. The finished paste may be used directly or run into a pan and allowed to solidify, after which it is broken into lumps for shipment or storage.

The air-dry vehicles may be prepared in the general manner described in the Deyrup patent. The squeegee paints using such vehicles are made by mixing silver powder and finely-milled glass flux with the vehicle in the desired proportions and then passing the resulting mixture through a roll mill or other type of equipment commonly used for dispersing pigments in vehicles.

The silver should be sufficiently finely divided to pass through a screen of 20 mesh size (20 meshes per linear inch) or finer. The particle size of the silver preferably will be at least as fine as about 200 mesh, e. g. 200 to 325 mesh. Since compounds such as silver oxide and silver carbonate are known to be reduced to metallic silver under the firing conditions involved, such compounds may replace all or part of the metallic silver and are intended to be included by the term "finely divided silver." However, metallic silver is preferred. Such metallic silver, or silver compound, will usually constitute from about 80% up to 100% of the unburnable solids content of either the hot-melt or the air-dry silver composition. Preferably, however, such solids content will include about 2 to 20% of a low-melting ground glass flux such as bismuth lead borosilicate or a lead borosilicate glass flux, the presence of which serves to improve adherence of the final silver coating to the underlying ceramic chip. The same type of glass flux in the same proportion of flux to silver will generally be used in the air-dry composition as is used in the hot-melt composition. The weight ratio of silver, or silver plus flux, to either type of vehicle is not particularly important and should be chosen to give the desired physical or working properties. Generally the ratio of silver, or silver plus flux, to vehicle will be 1–6:1, 2–5:1 being preferred.

Throughout the specification and in the claims the percentage values given are, unless otherwise specified, percentages by weight based upon the total weight of vehicle or silver composition.

We claim:

1. The method of producing a ceramic capacitor comprising applying a hot-melt type silver composition by the squeegee method to one side of a ceramic dielectric chip while maintaining said composition at a temperature of 120° to 230° F. and while said chip is at a temperature at least 15° F. below the melting temperature of said composition and, without intermediate drying, applying an air-dry type silver composition to the reverse side of said chip then firing the resulting coated chip, said hot-melt composition being non-volatile and solid at normal temperature and comprising a dispersion of finely divided silver in a vehicle which contains, on a weight basis: (a) 30 to 80% of a material which melts within the range 120 to 230° F. and is selected from the group consisting of waxes, mixtures of waxes and mixture of a wax with a material from the group consisting of palmitic and stearic acids; (b) 14 to 68% of a material from the group consisting of rosin and abietic acid, rosin esters and esters of abietic acid, polymerized rosin and polymerized abietic acid, hydrogenated rosin and hydrogenated abietic acid, and metal salts of rosin and of abietic acid; (c) 1 to 10% of ethyl cellulose; and (d) 0.5 to 10% of an organic phosphate material from the group consisting of lecithin and phosphorated tall oil, said air-dry composition comprising a dispersion of finely divided silver in a vehicle which includes a volatile solvent and has the property of solidifying upon removal of said volatile solvent therefrom by drying.

2. The method of claim 1 wherein the vehicle for the hot-melt silver composition contains, on a weight basis: 40 to 60% of ingredient (a); 35 to 55% of ingredient (b); 1 to 5% of ingredient (c); and 0.5 to 7% of ingredient (d), which is phosphorated tall oil.

3. The method of claim 1 wherein the vehicle for the air-dry silver composition contains, on a weight basis, 5 to 25% of ethyl cellulose and 75 to 95% of a solvent from the group consisting of butyl lactate, butyl carbitol acetate and mixtures thereof.

4. The method of claim 1 wherein the hot-melt composition also contains 0.01 to 1% pyrogallic acid.

5. The method of producing a ceramic capacitor comprising applying a hot-melt type silver composition by the squeegee technique to one side of a ceramic dielectric chip while maintaining said composition at a temperature of 120 to 230° F. and while said chip is at a temperature at least 15° F. below the melting temperature of said composition and, without intermediate drying, applying an air-dry type silver composition to the reverse side of said chip then firing the resulting coated chip, said hot-melt composition being non-volatile and solid at normal temperature and comprising a dispersion of finely divided silver in a vehicle which contains, on a weight basis: (a) 40 to 60% of a material which melts within the range 120 to 230° F. and is selected from the group consisting of waxes, mixtures of waxes and mixtures of a wax with a material from the group consisting of palmitic and stearic acids; (b) 35 to 55% of hydrogenated rosin, (c) 1 to 5% of ethyl cellulose; and (d) 0.5 to 7% of phosphorated tall oil, said air-dry composition comprising a dispersion of finely divided silver in a vehicle which includes a volatile solvent and has the property of solidifying upon removal of said volatile solvent therefrom by drying.

6. The method of claim 5 wherein the vehicle for the air-dry silver composition contains, on a weight basis, 5 to 25% of ethyl cellulose and 75 to 95% of a solvent from the group consisting of butyl lactate, butyl carbitol acetate and mixtures thereof.

References Cited in the file of this patent

UNITED STATES PATENTS

| Number | Name | Date |
| --- | --- | --- |
| 1,752,933 | Sullivan | Apr. 1, 1930 |
| 1,977,625 | Ernst | Oct. 23, 1934 |
| 2,018,343 | Bienfait et al. | Oct. 22, 1935 |
| 2,081,985 | Cornwell | June 1, 1937 |
| 2,163,601 | Humes | June 27, 1939 |
| 2,290,563 | Kauppi | July 21, 1942 |
| 2,297,709 | Kauppi et al. | Oct. 6, 1942 |
| 2,318,803 | Schneider et al. | May 11, 1943 |
| 2,346,579 | Henderson | Apr. 11, 1944 |
| 2,379,507 | Deyrup | July 3, 1945 |
| 2,429,089 | Box | Oct. 14, 1947 |
| 2,607,701 | Jessen | Aug. 19, 1952 |
| 2,607,702 | Jessen | Aug. 19, 1952 |

FOREIGN PATENTS

| Number | Country | Date |
| --- | --- | --- |
| 127,678 | Great Britain | June 12, 1919 |

OTHER REFERENCES

Gregory, Uses and Applications of Chemicals and Related Materials, vol. II, 1944, pp. 185 and 186.